United States Patent
Sethi et al.

(10) Patent No.: US 10,867,408 B1
(45) Date of Patent: Dec. 15, 2020

(54) ESTIMATION OF SPATIAL RELATIONSHIPS BETWEEN SENSORS OF A MULTI-SENSOR DEVICE

(71) Applicant: Apple Inc., Cupertino, CA (US)

(72) Inventors: Rohit Sethi, Mountain View, CA (US); Lejing Wang, Sunnyvale, CA (US); Jonathan Pokrass, Herzliya (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/518,245

(22) Filed: Jul. 22, 2019

Related U.S. Application Data

(60) Provisional application No. 62/701,888, filed on Jul. 23, 2018.

(51) Int. Cl.
*G06T 7/80* (2017.01)
*G06T 7/521* (2017.01)
(Continued)

(52) U.S. Cl.
CPC ............... *G06T 7/80* (2017.01); *G06T 7/521* (2017.01); *G06T 7/74* (2017.01); *H04N 5/2257* (2013.01);
(Continued)

(58) Field of Classification Search
CPC .. G06T 7/80; G06T 7/74; G06T 7/521; G06T 2207/10028; G06T 2207/10048;
(Continued)

(56) References Cited

U.S. PATENT DOCUMENTS

| 2011/0175983 A1* | 7/2011 | Park | H04N 13/239 |
| | | | 348/46 |
| 2012/0294510 A1* | 11/2012 | Zhang | G06T 7/521 |
| | | | 382/154 |

(Continued)

FOREIGN PATENT DOCUMENTS

| WO | WO 2017139871 | 8/2017 |

OTHER PUBLICATIONS

Grubert, Jens, Itoh, Yuta, Moser, Kenneth and Swan, J. Edward II, "A Survey of Calibration Methods for Optical See-Through Head-Mounted Displays"; Author version ARXiv:1709.04299v1[cs.HC]Sep. 13, 2017, pp. 1-15.

(Continued)

*Primary Examiner* — Alexander Gee
(74) *Attorney, Agent, or Firm* — Thompson Hine LLP

(57) ABSTRACT

In one implementation, a device has a processor, a projector, a first infrared (IR) sensor, a second IR sensor, and instructions stored on a computer-readable medium that are executed by the processor to estimate the sensor-to-sensor extrinsic parameters. The projector projects IR pattern elements onto an environment surface. The first sensor captures a first image including first IR pattern elements corresponding to the projected IR pattern elements and the device estimates 3D positions for first IR pattern elements. The second IR sensor captures a second image including second IR pattern elements corresponding to the projected IR pattern elements and the device matches the first IR pattern elements and the second IR pattern elements. Based on this matching, the device estimates a second extrinsic parameter corresponding to a spatial relationship between the first IR sensor and the second IR sensor.

20 Claims, 7 Drawing Sheets

(51) Int. Cl.
*H04N 17/00* (2006.01)
*H04N 5/247* (2006.01)
*G06T 7/73* (2017.01)
*H04N 5/232* (2006.01)
*H04N 5/225* (2006.01)

(52) U.S. Cl.
CPC ......... *H04N 5/23216* (2013.01); *H04N 5/247* (2013.01); *H04N 17/002* (2013.01); *G06T 2207/10028* (2013.01); *G06T 2207/10048* (2013.01)

(58) Field of Classification Search
CPC .. H04N 5/2257; H04N 5/23216; H04N 5/247; H04N 17/002
See application file for complete search history.

(56) References Cited

U.S. PATENT DOCUMENTS

| | | | |
|---|---|---|---|
| 2014/0274391 A1* | 9/2014 | Stafford | H04N 13/327 463/32 |
| 2014/0334674 A1* | 11/2014 | Lorenzoni | G06T 7/97 382/103 |
| 2015/0032260 A1* | 1/2015 | Yoon | A47L 11/4011 700/257 |
| 2015/0254819 A1* | 9/2015 | Hara | G06T 5/006 345/647 |
| 2016/0033770 A1* | 2/2016 | Fujimaki | H04N 13/344 345/8 |
| 2016/0195723 A1* | 7/2016 | Murray | G02B 27/0176 359/631 |
| 2016/0261300 A1* | 9/2016 | Fei | G06F 3/017 |
| 2016/0288330 A1* | 10/2016 | Konolige | H04N 13/239 |
| 2017/0344107 A1* | 11/2017 | Aghara | G02B 27/0179 |
| 2018/0020207 A1* | 1/2018 | Sugimura | G06T 7/521 |
| 2018/0176544 A1* | 6/2018 | Wang | H04N 5/332 |
| 2018/0204329 A1* | 7/2018 | Cutu | G06T 5/50 |

OTHER PUBLICATIONS

Jun, Hanseul and Kim, Gunhee, "A Calibration Method for Optical See-through Head-mounted Displays with a Depth Camera"; Seoul National University; 2016 IEEE Virtual Reality (VR); pp. 1-9.

\* cited by examiner

ESTIMATION OF SPATIAL RELATIONSHIPS BETWEEN SENSORS OF A MULTI-SENSOR DEVICE

CROSS-REFERENCE TO RELATED APPLICATION

This Application claims the benefit of U.S. Provisional Application Ser. No. 62/701,888 filed Jul. 23, 2018, which is incorporated herein in its entirety.

TECHNICAL FIELD

The present disclosure generally relates to devices having cameras or other sensors that may move relative to one another, and in particular, to systems, methods, and devices for estimating the spatial relationships between such sensors.

BACKGROUND

Various devices include two or more sensors that may move relative to one another. For example, a head mounted device (HMD) may include a left eye display and a right eye display that collectively display a field of view based on images, depth information, or other data captured from a left sensor and a right sensor. Each of these sensors is typically factory calibrated with intrinsic parameters that specify the attributes of its internal components (e.g., focal length, pixel size, center of projection, etc.). Similarly, a factory calibration may provide extrinsic parameters that specify spatial relationships with respect to related components. For example, extrinsic parameters for an IR projector/sensor unit (e.g., a depth sensor unit) may specify the spatial relationship between the projector and the sensor of the unit (e.g., with respect to 6 degrees of freedom).

Where multiple sensors are included in a device such as an HMD, extrinsic parameters may also specify the spatial relationships between such sensors (e.g., with respect to 6 degrees of freedom). Initially such spatial relationships between the multiple sensors may be known based on the factory production of the device. However, such spatial relationships may change, for example, due to intentional adjustments on the device (e.g., to move the sensors to account for different inter-pupillary distances (IPDs) of the device's users) or unintentional events (e.g., damage to the device that moves the sensors relative to one another). Existing devices do not accurately and efficiently determine the spatial relationships between sensors.

SUMMARY

Various implementations disclosed herein include devices, systems, and methods that estimate the spatial relationships between sensors on multi-sensor devices. In one implementation, a device has a processor, a projector, a first infrared (IR) sensor, a second IR sensor, and instructions stored on a computer-readable medium that are executed by the processor to estimate the sensor-to-sensor extrinsic parameters that correspond to the spatial relationships. The projector projects IR pattern elements onto an environment surface. The first IR sensor captures a first image including first IR pattern elements corresponding to the projected IR pattern elements and the device estimates 3D positions for the first IR pattern elements. The 3D positions of the IR pattern elements are estimated according to a first extrinsic parameter corresponding to a spatial relationship between the projector and the first IR sensor, e.g., based on knowing where the projector is in relation to the first IR sensor. The 3D positions of the first IR pattern elements relative to the first IR sensor are thus determined.

The position of the second IR sensor is also determined. The second IR sensor captures a second image including second IR pattern elements corresponding to the projected IR pattern elements. The device matches the first IR pattern elements and the second IR pattern elements. Based on this matching, the device estimates a second extrinsic parameter corresponding to a spatial relationship between the first IR sensor and the second IR sensor. The spatial relationship can be estimated with respect to one or more of the six degrees of freedom, e.g., with respect to relative position or rotation on three perpendicular axes of a 3D coordinate system. In this example, the device determines the first IR sensor's position and orientation relative to the first IR pattern element and the second IR sensor's position and orientation relative to second IR pattern elements. Thus, by matching the 3D positions of the first IR pattern element and second IR pattern elements, the device is able to determine the relative position and orientation of the first IR sensor to the second IR sensor.

In another implementation, the device provides at least one reference image of an IR pattern. The device matches the first image and the at least one reference image to determine a spatial relationship between the first IR sensor and a reference position. The device matches the second image and the at least one reference image to determine a spatial relationship between the second IR sensor and a reference position. The relative position and orientation of the first IR sensor to the second IR sensor is determined based on the previously estimated spatial relationships.

In one example, an HMD includes two sensors that move laterally relative to one another. The spatial relationship between these sensors can be estimated using the above technique and other techniques disclosed herein. In some implementations, the lateral distance between the sensors corresponds to an inter pupillary distance (IPD) and the techniques are able to determine whether the sensors are correctly positioned (e.g., at positions corresponding to the user's IPD). In some implementations, the HMD receives input specifying an IPD and automatically moves the sensors relative to one another to provide the input-specified IPD. For example, the device may determine the device's current sensor-to-sensor distance (and thus the device's current IPD) using a sensor-to-sensor extrinsic parameter estimation technique, determine a difference between the current IPD and the input-specified IPD, and move the sensors based on the determined difference to achieve a sensor-to-sensor distance corresponding to the specified IPD.

In another implementation, the device has a first visible spectrum image sensor (e.g., a red-green-blue (RGB) camera), a second visible spectrum image sensor, a depth sensor, and instructions stored on a computer-readable medium that are executed by the processor to estimate the sensor-to-sensor extrinsic parameters. The first visible spectrum image sensor captures a first image including first image features and the device estimates 3D positions for the first image features. The positions of the first image features can be estimated based on depth information from the depth sensor and a first extrinsic parameter corresponding to a spatial relationship between the depth sensor and the first visible spectrum image sensor. The second visible spectrum image sensor captures a second image of second image features and the device matches the first image features and the second image features. Based on this matching, the device estimates a second extrinsic parameter corresponding to a spatial relationship between the first visible spectrum image sensor and the second visible spectrum image sensor.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, multiple image sensors, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
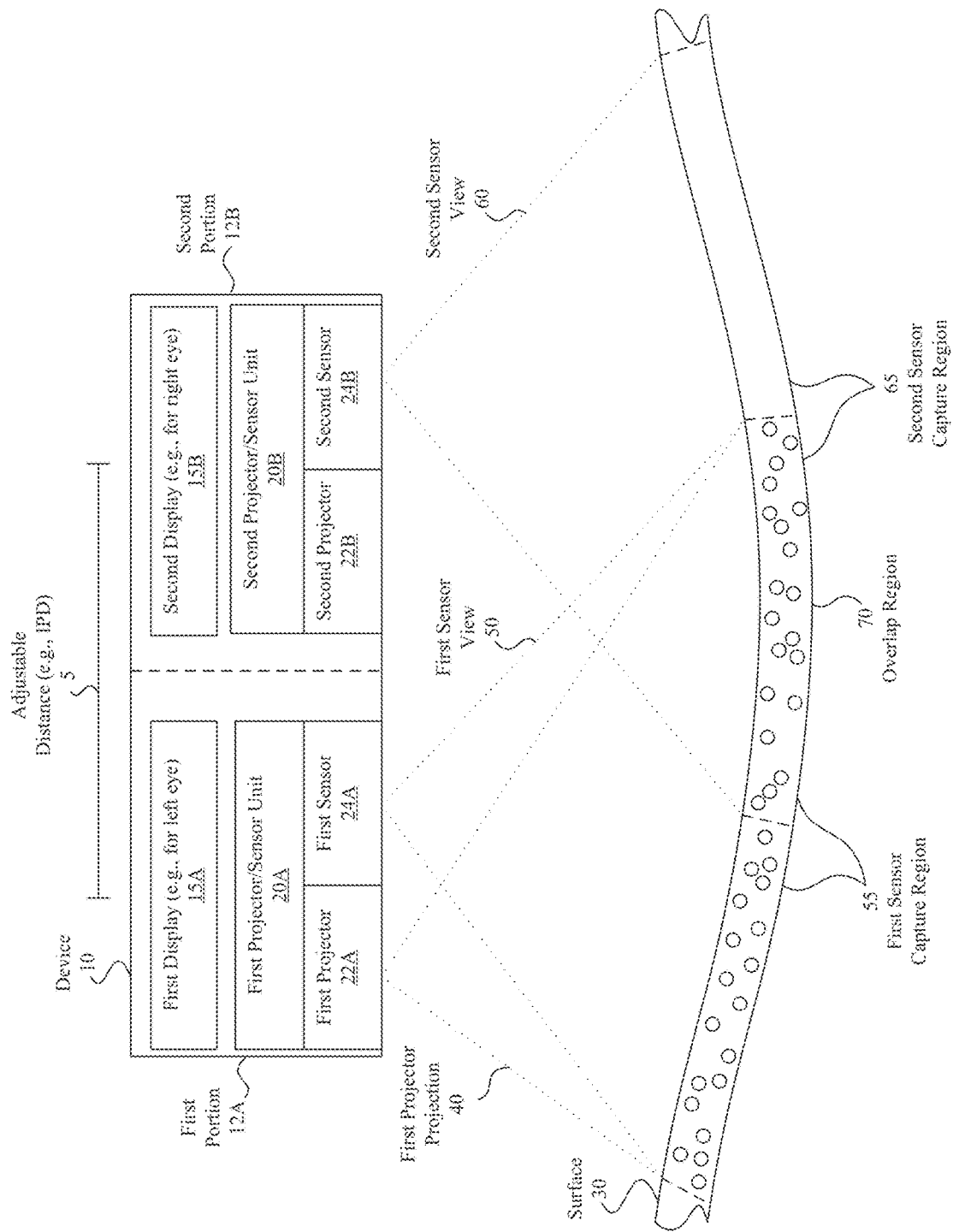
FIG. 1 is a block diagram of an example multi-sensor device projecting a pattern of elements onto a surface and capturing images of the surface.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, FIG. 1 is a block diagram of an example multi-sensor device 10 projecting a pattern of elements onto a surface 30 and capturing images of the surface 30. The surface 30 is illustrated and discussed as a single surface but could include one or more surfaces of one or more objects. The device 10 includes two portions: first portion 12A and second portion 12B. The device 10 is configured to allow the first portion 12A and second portion 12B to move relative to one another to change the adjustable distance 5, e.g., to change the inter pupillary distance (IPD) of the device 10. In this example, each portion includes a display and a projection/sensor unit, such as an IR-based depth sensor. In this example, the first portion 12A includes a first display 15A that is configured to display images to the left eye of a user of the device 10. The second portion 12B includes a second display 15B that is configured to display images to the right eye of the user of the device 10.

The first projection/sensor unit 20A includes a first projector 22A (e.g., an IR projector) and a first sensor 24A capable of capturing images that include elements projected by the first projector 22A. In one implementation, the first projector 22A projects produces a first projector projection 40 including IR pattern elements (e.g., IR dots) onto a portion of the surface 30. The first sensor 24A has a first sensor view 50 and captures images of the surface 30 including the projected IR pattern elements within the first sensor capture region 55.

The spatial relationship between the first projector 22A and the first sensor 24A in the first projector/sensor unit 20A is known (and generally stable). This stable spatial relationship corresponds to one or more known extrinsic parameters that facilitate determining 3D positions of the projected pattern elements that are captured in images by the first sensor 24A. In this way, the first projector/sensor unit 20A can acts as a depth sensor, sensing the 3D positions of IR pattern elements projected onto surface 30 and thus to 3D positions of the corresponding portions of that surface 30. The extrinsic parameters (between first projector 22a and first sensor 24A) may be specified and thus known based on the factory calibration of the first projector/sensor unit 20A. In addition, the 3D position and orientation of the first sensor 24A relative the 3D positions of the projected pattern elements is determined.

The second projection/sensor unit 20B includes a second projector 22B (e.g., an IR projector) and a second sensor 24B. In this example, the second projector 22B is not used to estimate the sensor-to-sensor extrinsic parameters and could be omitted from the device 10. However, exemplary device 10 is shown illustrating a second projector/sensor unit 20B that includes a second projector 22B to illustrate an exemplary implementation involving two projector/sensor units 20A, 20B which may be collectively used for other purposes including, but not limited to, determining depth data corresponding to a full field of view of the device 10 by combining depth information determined by each of the two projector/sensor units 20A, 20B. The second sensor 24B has a second sensor view 60 and captures images of the surface 30 that include the second sensor capture region 65, including the overlap region 70. The second sensor 24B thus can capture one or more images that include the projected IR pattern elements, e.g., from the overlap region 70.

The device 10 matches projected pattern elements in the overlap region 70 in images captured by the first sensor 24A and the second sensor 24B. Based on this matching, the device 10 estimates an extrinsic parameter corresponding to a spatial relationship between the first sensor 24A and the second sensor 24B. The spatial relationship can be defined with respect to one or more of the six degrees of freedom, e.g., with respect to relative position or rotation on three perpendicular axes of a 3D coordinate system. The device 10 can determine the first sensor's position and orientation relative to the pattern elements it detected in the overlap region 70 and the second sensor's position and orientation relative to matching pattern elements it detected in the overlap region 70. Thus, by matching the 3D positions of the projected pattern elements in the images detected by the two sensors 24A, 24B, the device 10 is able to determine the relative position and orientation of the first sensor 24A to the second sensor 24B.

Figure 2:
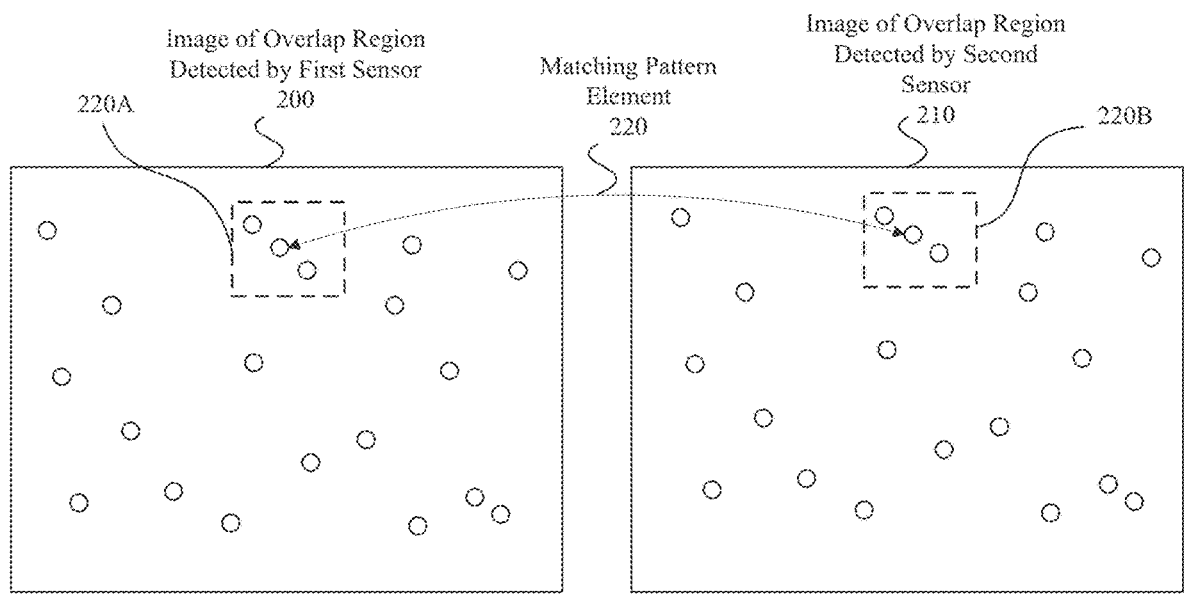
FIG. 2 is a block diagram illustrating matching pattern element in the images captured by two sensors of the device of FIG. 1.

FIG. 2 is a block diagram illustrating matching pattern elements in the images captured by the two sensors 24A, 24B of the device 10 of FIG. 1. In this example, the first sensor 24A has captured an image 200 of the overlap region 70 and the second sensor 24B has captured an image 210 of the overlap region 70. Each of the images 200, 210 includes depictions of the pattern elements (e.g., IR dots) that were projected by the first projector 22A onto the overlap region 70. The device 10 matches pattern elements in the two images 200, 210. In one implementation, the arrangement of a group of multiple pattern elements or the relationship of pattern elements to one another is used to identify particular pattern elements. In this example, the device 10 detects the group 220A of pattern elements in the image 200 based on the arrangement of the three pattern elements in an approximate line. Similarly the device 10 detects the corresponding group 220B of pattern elements in the image 210 based on the similar arrangement of three pattern elements in an approximate line. The device 10 can thus match the respective three elements in the groups 210A, 220B to one another. For example, FIG. 2 illustrates matching 220 the middle pattern elements in each of the groups 210A, 220B to one another.

Some implementations provide techniques for estimating sensor-to-sensor extrinsic parameters that correspond to the spatial relationships between the sensors and, in doing so, are able to account for scale based on image information. Some existing calibration techniques are unable to accurately estimate these sensor-to-sensor extrinsic parameters using image data because the scale of the image data is unknown. Some implementations disclosed herein differ from prior techniques by using IR projection and a known IR pattern to recover depth information in order to recover the depth/scale, which accordingly allows the spatial relationships between multiple cameras to be estimated accurately.

The matching of IR pattern elements (e.g., IR dots) between two images may lack accuracy in cases of noise, pattern repeat, or in certain environments and circumstances. The accuracy of the matching of pattern elements can be improved in some implementations by localizing the matching to matching within identified objects. Accordingly, the device 10 may detect an object depicted in the image from the first sensor 24A (e.g., the first image) and the image from the second sensor 24B (e.g., the second image) and then match pattern elements on the object in the first image with pattern elements on the object in the second image. In one example, a user may place an object (e.g., the user's hand) in the field of view of a left IR sensor, a right IR sensor, and a left projector. The left projector projects IR dots into the environment including the hand object. The left and right IR sensors capture the dots and the hand into a left image and a right image. The device then performs hand detection/ segmentation (e.g., using a convolutional neural network (CNN)-based or edge-based detection technique) to detect hand regions in the left image and the right image. The device can then match the dots or a 3D point clouds that are within the hand regions. The device might also reconstruct a first 3D shape of the hand based on the first image and a second 3D shape of the hand based on the second image. The relative position and orientation of the first IR sensor to the second IR sensor is determined based on aligning the first and the second the shape of the hand. The estimation of the 3D shape of the hands may depend on a provided 3D model of the hand.

Figure 3:
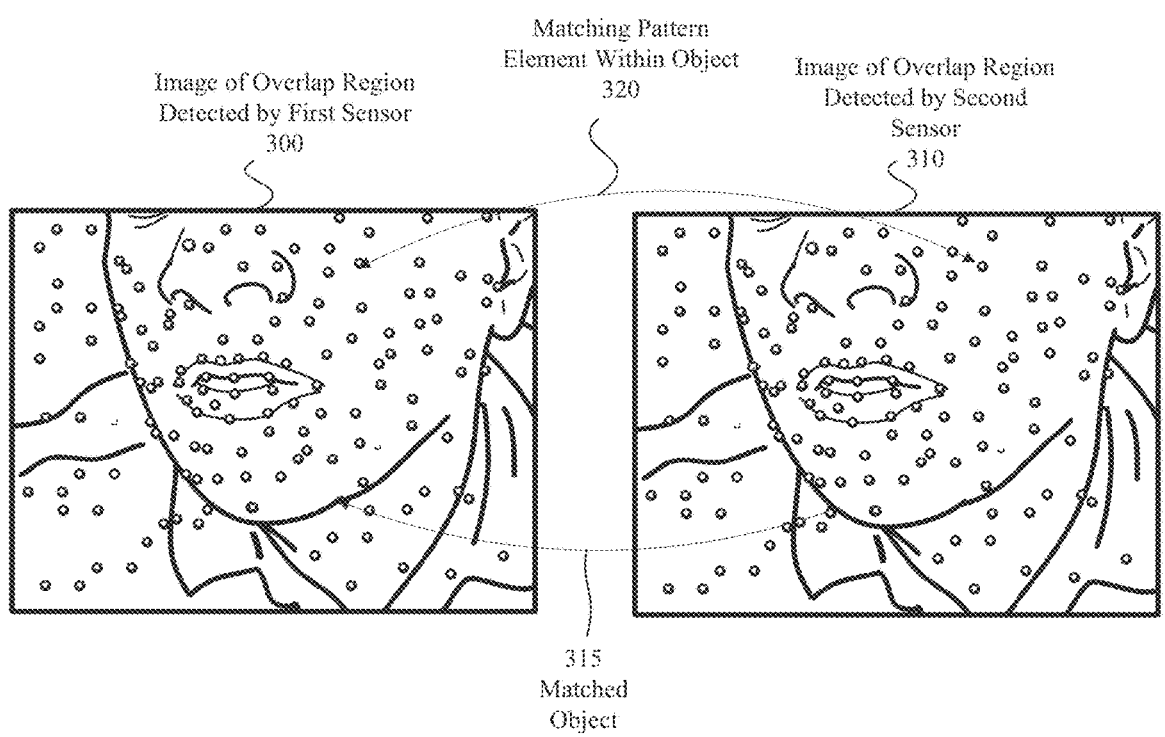
FIG. 3 is a block diagram illustrating matching pattern elements within matched objects in the images captured by the two sensors of the device of FIG. 1.

FIG. 3 is a block diagram illustrating matching of pattern element within matched objects in the images captured by the two sensors of the device 10 of FIG. 1. In this example, the first sensor 24A has captured an image 300 of the overlap region 70 and the second sensor 24B has captured an image 310 of the overlap region 70. Each of the images 300, 310 includes depictions of multiple objects (e.g., a person's face, nose, lips, ear, neck, shirt, etc.) and these objects include the pattern elements (e.g., IR dots) that were projected by the first projector 22A onto the overlap region 70. The device 10 matches an object that is found in each of the images 300, 310. In this example, FIG. 3 illustrates that the face of the person in image is the matched object 315 found in each of the images 300, 310. Multiple objects may be matched in some implementations. The device 10 matches projected pattern elements found within the corresponding/matched objects. For example, FIG. 3 illustrates matching 320 a pattern element within the object, e.g., within the depicted face.

The techniques for estimating sensor-to-sensor extrinsic parameters that correspond to the spatial relationships between sensors are discussed with respect to the device 10 as being performed by device 10. In one implementation, a processor on device 10 executes instructions stored in a non-transitory computer readable medium on device 10 to make the determinations. In other implementations, a separate device such as a separate controller or server device performs the determinations. For example, images captured by the sensors 24A, 24B, extrinsic parameters specifying the spatial relationship between the first sensor 24A and projector 22A, intrinsic parameters of the projector or sensors 24A, 24B, or any other relevant information can be communicated from the device 10 to the separate device to enable the separate device to perform the relevant determinations.

In some implementations, a device, such as device 10, is a head-mounted device (HMD) that is worn by a user. An HMD may enclose the field-of-view of the user. The HMD can include one or more screens or other displays configured to display computer generated reality (CGR) (e.g., virtual reality (VR) or mixed reality (MR) such as augmented reality (AR)), and other types of content. In some implementations, an HMD includes a screen or other display to display the content in a field-of-view of the user. In some implementations, the HMD is worn in a way that a screen is positioned to display the content in a field-of-view of the user.

In one example, an HMD includes two sensors that move laterally relative to one another, for example, via a sliding mechanism, to adjust for different users. The spatial relationship between these sensors (or displays associated with each of these sensors) at any point in time can be estimated using the techniques disclosed herein. In some implementations, the lateral distance between the sensors or associated displays corresponds to an inter pupillary distance (IPD) and the techniques are able to determine whether the sensors are correctly positioned (e.g., at relative positions corresponding to the user's IPD). In some implementations, the device receives input specifying an IPD and automatically moves the sensors and associated displays relative to one another to provide the input-specified IPD. For example, the device may determine the device's current sensor-to-sensor or display-to-display distance (and thus the device's current IPD) using a sensor-to-sensor/display-to-display extrinsic parameter estimation technique, determine a difference between the current IPD and the input-specified IPD, and move the sensors/displays based on the determined difference to achieve a sensor-to-sensor/display-to-display distance corresponding to the specified IPD.

Figure 4:
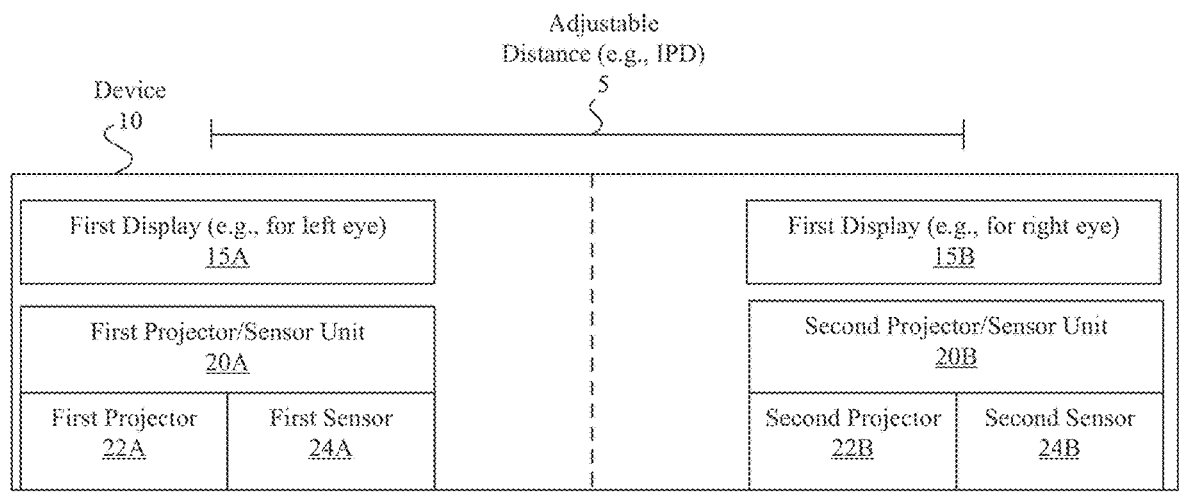
FIG. 4 is a block diagram illustrating an inter-pupillary distance (IPD) adjustment of the device of FIG. 1.

FIG. 4 is a block diagram illustrating an inter-pupillary distance (IPD) adjustment of the device 10 of FIG. 1. In this example, a user has provided input identifying the user's IPD, e.g., 68 mm, and the device 10 had previously determined that in the configuration illustrated in FIG. 1, the sensors 24A, 24B were separated by an adjustable distance 5 corresponding to an initial IPD, e.g., 64 mm. The device 10 automatically changes its physical configuration to move the sensors 24A, 24B further apart from one another to correspond to the desired IPD, e.g., 68 mm. As can be seen by comparing FIGS. 1 and 4, the adjustable distance 5 and thus the corresponding distance between sensors 24A, 24B has increased from FIG. 1 to FIG. 4.

Figure 5:
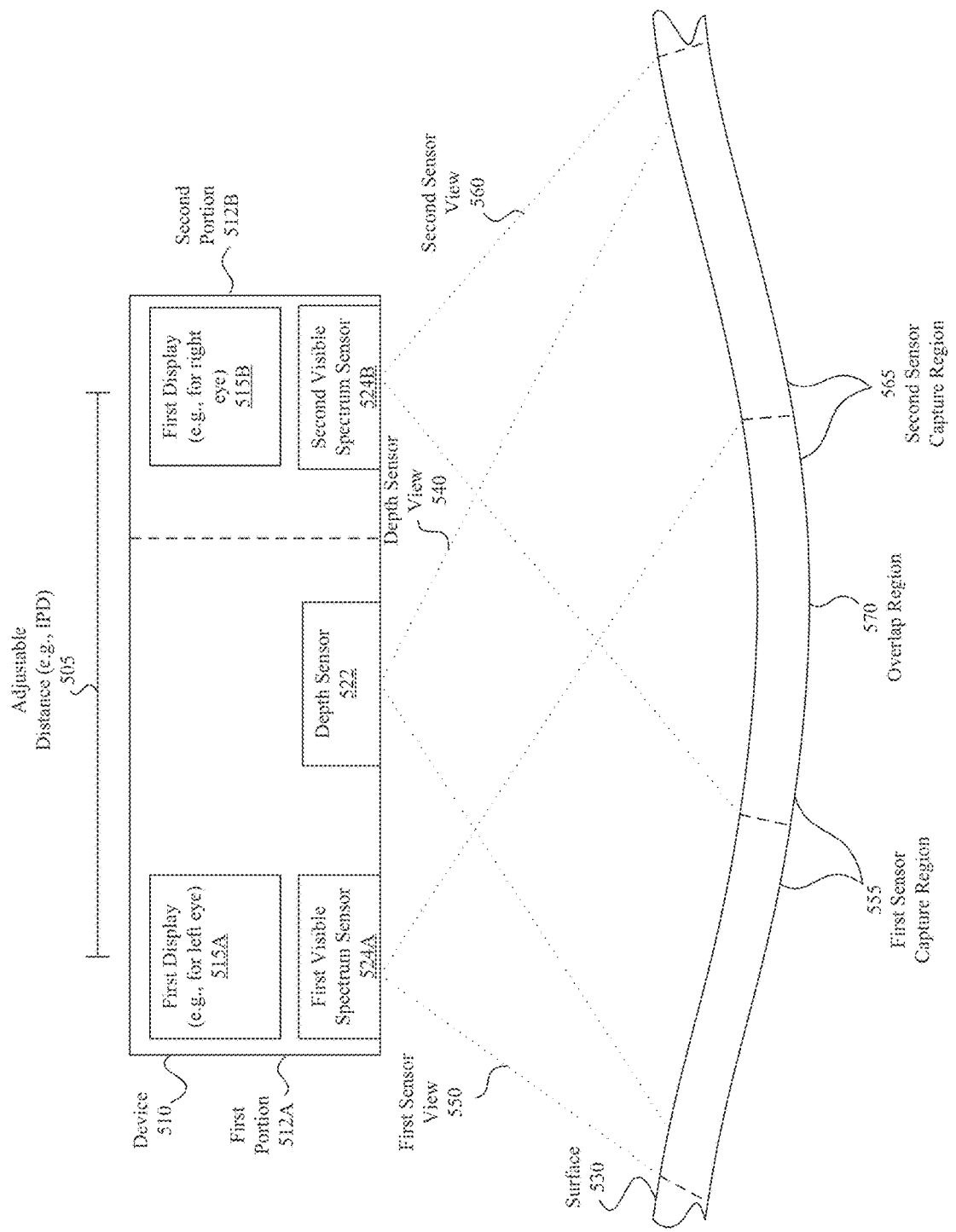
FIG. 5 is a block diagram of another example multi-sensor device including two visible spectrum image sensors and a depth sensor.

FIG. 5 is a block diagram of another example multi-sensor device 510 including two visible spectrum image sensors 524A, 524B and a depth sensor 522. The device 510 includes two portions: first portion 512A and second portion 512B. The device 510 is configured to allow the first portion 512A and second portion 512B to move relative to one another to change the adjustable distance 505, e.g., to change the inter pupillary distance (IPD) of the device 510. In this example, each portion includes a display and a sensor and at least one of the portions also includes a depth sensor. In this example, the first portion 512A includes a first display 515A that is configured to display images to the left eye of a user of the device 510. The second portion 512B includes a second display 515B that is configured to display images to the right eye of the user of the device 510.

The first visible spectrum sensor 524A has a first sensor view 550 and captures images of the surface 530 within the first sensor capture region 555, including the overlap region 570. Similarly, the second sensor 524B has a second sensor view 560 and captures images of the surface 530 that include the second sensor capture region 565, including the overlap region 570. The surface 530 is illustrated and discussed as a single surface but could include one or more surfaces of one or more objects.

The depth sensor 522 can include an IR projector/sensor unit, a structured light unit, a time-of-flight unit, or the any other existing or to-be-developed type of depth sensor. The depth sensor 522 senses the depth of the environment within the depth sensor view 540. The depth sensor 522 can produce an image or other depth map that specifies depth values (e.g., distance from the depth sensor) of pixels corresponding to different portions of the depth sensor view 540. The pixels of an image or other depth map from the depth sensor 522 can be associated with corresponding pixels of an image from the first visible spectrum sensor 524A. The spatial relationship between the depth sensor 522 and the first sensor 24A in the first visible spectrum sensor 524A is known (and generally stable). In one implementation the first visible spectrum sensor 524 and depth sensor are integrated in a single RGB-D camera.

The stable spatial relationship between the depth sensor 522 and first visible spectrum sensor 524A corresponds to one or more known extrinsic parameters that facilitate determining 3D positions of visible spectrum pixels (e.g., RGB pixels) that are captured in images of the first visible spectrum sensor 524A. The extrinsic parameters (between depth sensor 522 and the first visible spectrum sensor 524A) may be specified and thus known based on factory calibration of the device 510. The 3D position and orientation of the first visible spectrum sensor 524A relative the 3D positions of the visible spectrum pixels in an image captured by the first visible spectrum sensor 524A is also determined.

The device 510 uses images from each of the sensors 524A, 524B and depth information from the depth sensor 522 to estimate an extrinsic parameter corresponding to a spatial relationship between the first visible spectrum image sensor 524A and the second visible spectrum image sensor 524B. The first visible spectrum image sensor 524A captures a first image of first image features, at least some of which are in overlap region 570. The device 515 estimates 3D positions for features (e.g., based on object detection, scale invariant feature transform (SIFT)-based feature detection, oriented fast and rotated brief (ORB)-based feature detection, machine learning-identified features, or any feature descriptors used in computer vision) of this image based on depth information from the depth sensor 522 and a first extrinsic parameter corresponding to a spatial relationship between the depth sensor 522 and the first visible spectrum image sensor 524A. The second visible spectrum image sensor 524B captures a second image of second image features, at least some of which are in overlap region 570. The second image includes features similar to those of the first image. The device 510 matches the first image features and the second image features.

Figure 6:
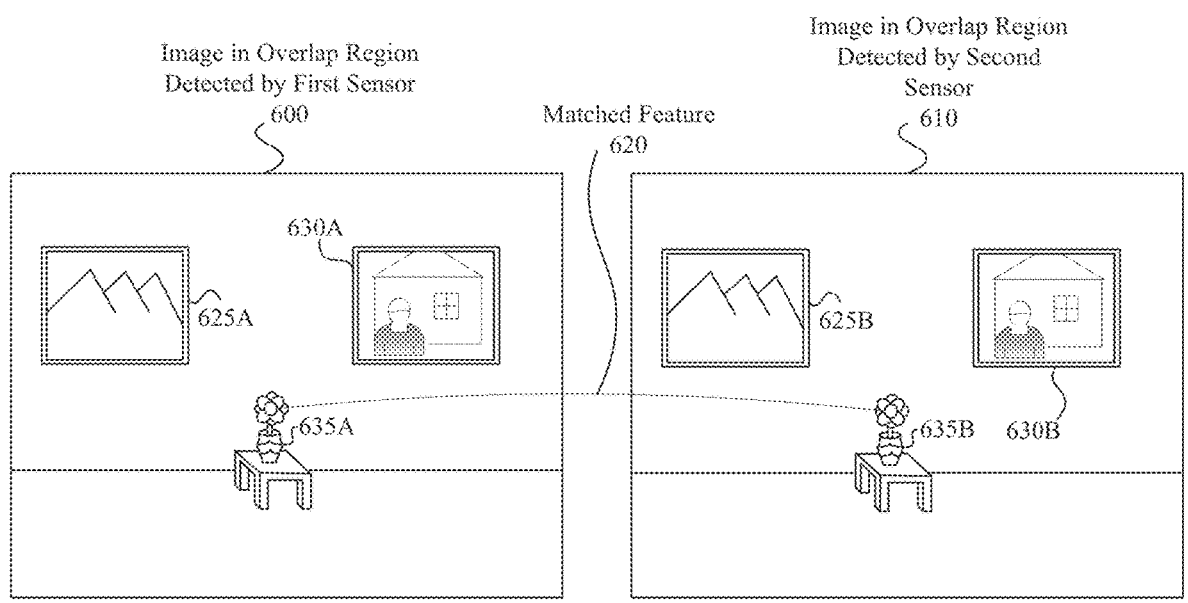
FIG. 6 is a block diagram illustrating the matching of features in images captured by the two visible spectrum image sensors of the device of FIG. 5.

FIG. 6 is a block diagram illustrating the matching of features in images captured by the two visible spectrum image sensors of the device 510 of FIG. 5. Image 600 depicts RGB pixels corresponding to overlap region 570 and includes, among other features, a vase 635A on a table, a framed picture 625A of a mountain, a framed picture 630A of a person in front of a house, a wall, and a floor. Image 700 depicts RGB pixels also corresponding to overlap region 570 and includes corresponding features, including, a vase feature 635B, a framed picture 625B of a mountain, a framed picture 630B of a person in front of a house, a wall, and a floor. In this example, the features are objects. FIG. 6 illustrates a matched feature 620, the flower 635A matched to the flower 635B. In other implementations, the features correspond to other types of detectable image elements. For example, neural network and other machine-learning techniques can be employed to identify and match similar features in the images.

Based on matching one or more features in the images from the sensors 524A, 524B, the device 510 estimates an extrinsic parameter corresponding to a spatial relationship between the first visible spectrum image sensor 524A and the second visible spectrum image sensor 524B. The spatial relationship can be defined with respect to one or more of the six degrees of freedom, e.g., with respect to relative position or rotation on three perpendicular axes of a 3D coordinate system. By matching the 3D positions of the image features in the images detected by the two sensors 524A, 524B, the device 510 is able to determine the relative position and orientation of the first visible spectrum sensor 524A to the second visual spectrum sensor 524B.

The techniques for estimating sensor-to-sensor extrinsic parameters that correspond to the spatial relationships between the first sensor 524A and 524B are discussed with respect to the device 10 as being performed by device 510. In one implementation, a processor on device 510 executes instructions stored in a non-transitory computer readable medium on device 510 to make the determinations. In other implementations, a separate device such as a separate controller or server device performs the determinations. For example, images captured by the sensors 524A, 524B, depth information captured by the depth sensor 522, extrinsic parameters specifying the spatial relationship between the first sensor 524A and depth sensor 522, intrinsic parameters of the depth sensor 522 or sensors 524A, 524B, or any other relevant information can be communicated from the device 510 to the separate device to enable the separate device to perform the relevant determinations.

In some implementations, a device, such as device 510, is a head-mounted device (HMD) that is worn by a user. In one example, an HMD includes two sensors that move laterally on a device relative to one another. The spatial relationship between these sensors at any point in time can be estimated using the techniques disclosed herein. In some implementations, the lateral distance between the sensors corresponds to an inter pupillary distance (IPD) and the techniques are able to determine whether the sensors are correctly positioned (e.g., at relative positions corresponding to the user's IPD). In some implementations, the device 510 receives input specifying an IPD and automatically moves the sensors relative to one another to provide the input-specified IPD.

Figure 7:
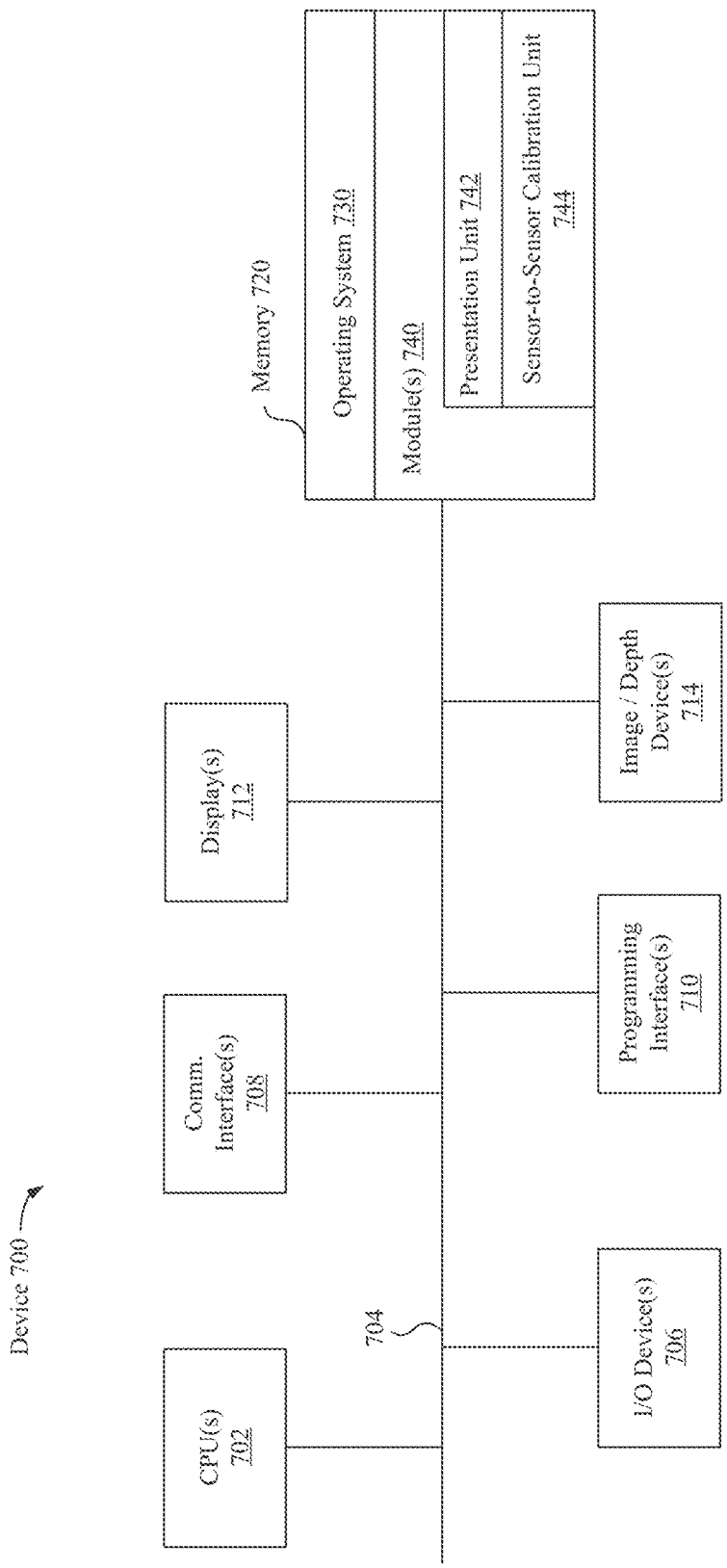
FIG. 7 is a block diagram illustrating device components of an exemplary device according to some implementations.

FIG. 7 is a block diagram illustrating device components of a device 700 according to some implementations. The configuration of device 700 could be used for device 10 or FIGS. 1-4 of device 510 of FIGS. 5-6. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 710, one or more displays 712, and one or more image/depth devices 714, a memory 720, and one or more communication buses 704 for interconnecting these and various other components.

In some implementations, the one or more communication buses 704 include circuitry that interconnects and controls communications between system components. In some implementations, the one or more I/O devices 706 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, or the like. In some implementations, movement, rotation, or position of the device 700 detected by the one or more I/O devices 706 provides input to the device 700.

In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 712 correspond to diffractive, reflective, polarized, holographic, etc. waveguide displays. In one example, the device 700 includes a single display. In another example, the device 700 includes an display for each eye. In some implementations, the one or more displays 712 are configured to present a CGR environment.

In some implementations, the one or more image/depth devices 714 are configured to project infrared or visible spectrum light and obtain infrared or visual spectrum image data that corresponds to at least a portion of a scene local to the device 700. The one or more image/depth devices 714 can include one or more RGB cameras (e.g., with a complimentary metal-oxide-semiconductor (CMOS) image sensor or a charge-coupled device (CCD) image sensor), monochrome camera, IR camera, event-based camera, or the like. The one or more image/depth device 714 can include one or more depth sensors (e.g., a structured light sensor, a time-of-flight sensor, or the like). In various implementations, the one or more image/depth devices 714 further include illumination sources that emit light, such as a flash.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 730 and one or more module 740.

The operating system 730 includes procedures for handling various basic system services and for performing hardware dependent tasks. The modules 740 include a presentation unit 742 and a sensor-to-sensor calibration unit 744. The presentation unit 742 presents content on the one or more displays 712. For example, the presentation unit 742 may combine real world image data with virtual object data to provide a CGR environment on the one or more displays 712. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, an HMD in which at least some light of the physical environment may pass through a transparent or translucent display is called an "optical see through" HMD.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies.

The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The sensor-to-sensor calibration unit 744 uses data from the image/depth device(s) 714 to estimate the extrinsic parameters corresponding to the spatial relationships amongst the image/depth device(s) 714.

In some implementations, the block diagram illustrating components of device 700 can similarly represent the components of an HMD. Such an HMD can include a housing (or enclosure) that houses various components of the HMD. The housing can include (or be coupled to) an eye pad disposed at a proximal (to the user) end of the housing. In some implementations, the eye pad is a plastic or rubber piece that comfortably and snugly keeps the HMD in the proper position on the face of the user (e.g., surrounding the eye of the user). The housing can house a display that displays an image, emitting light towards one or both of the eyes of a user.

FIG. 7 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 8:
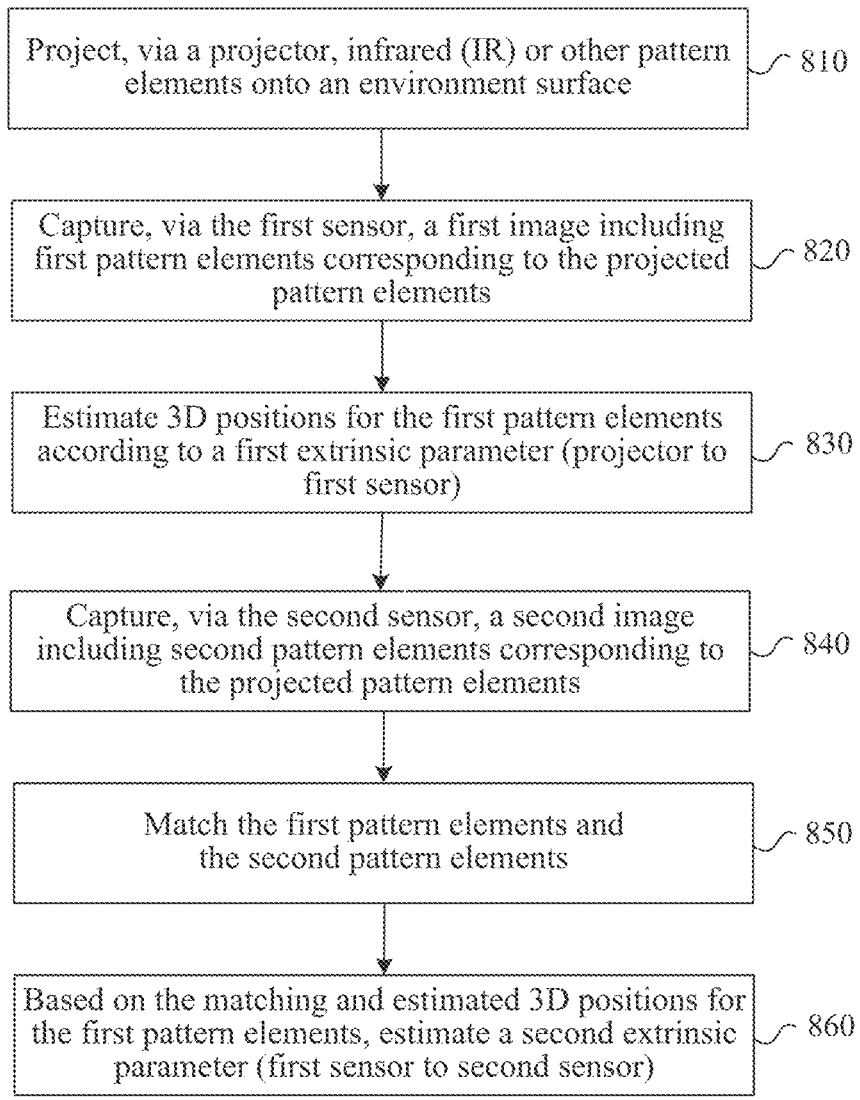
FIG. 8 is a flowchart representation of a method for estimating an extrinsic parameter representing a sensor-to-sensor spatial relationship between sensors of a multi-sensor device.

FIG. 8 is a flowchart representation of a method 800 for estimating an extrinsic parameter representing a sensor-to-sensor spatial relationship between sensors of a multi-sensor device. In some implementations, the method 800 is performed by a device that has processor, a projector, a first infrared (IR) sensor, a second IR sensor, and instructions stored on a computer-readable medium (e.g., device 10 of FIGS. 1-4). The device may be configured to change the spatial relationship between the first IR sensor and the second IR sensor in response to user manipulation of the device or user input on the device. The method 800 can be performed at an HMD, mobile device, desktop, laptop, or server device. The method 800 can be performed on a HMD that has a single or multiple screens, for example, for viewing stereoscopic images. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 projects, via the projector, infrared (IR) or other pattern elements onto an environment surface. At block 820, the method 800 captures, via the first sensor (e.g., IR), a first image of first pattern (e.g., IR) elements corresponding to the projected pattern elements (e.g., IR). At block 830, the method 800 estimates 3D positions for the projected pattern elements according to a first extrinsic parameter corresponding to a spatial relationship between the projector and the first sensor. The estimating of the 3D positions for the projected pattern elements can be additionally based upon intrinsic parameters of the projector or the first sensor.

At block 840, the method 800 captures, via the second sensor (e.g., IR), a second image of second pattern elements corresponding to the projected pattern elements. At block 850, the method 800 matches the first pattern elements and the second pattern elements. In some implementations, this involves detecting an object depicted in the first image and the second image and matching first pattern elements on the object in the first image with second pattern elements on the object in the second image.

At block 860, based on the matching and the estimated 3D positions for the first pattern elements, the method 800 estimates a second extrinsic parameter corresponding to a spatial relationship between the first sensor and the second sensor, or associated displays. In some implementations, the spatial relationship between the first sensor and the second sensor or associated displays is estimated with respect to six degrees of freedom. In some implementations, the method 800 further involves calibrating the second sensor to the first sensor based on the extrinsic parameters. In one example, this involves adjusting spatial relationship information regarding the first sensor and second sensor or associated displays to more accurately correspond to the estimated extrinsic parameter.

In some implementations, the method 800 further involves identifying a desired inter-pupil distance (IPD) corresponding to a user of the device and automatically changing the spatial relationship between the first sensor and the second sensor or associated displays to correspond to the desired IPD.

In addition to the IR sensors, the device that performs method 800 can include one or more visible spectrum image sensors. In one implementation, the device has a first visible spectrum image sensor in a fixed spatial relationship to the first sensor and corresponding to a first display on the HMD and a second visible spectrum image sensor in a fixed spatial relationship to the second sensor and corresponding to a second display of the HMD.

Figure 9:
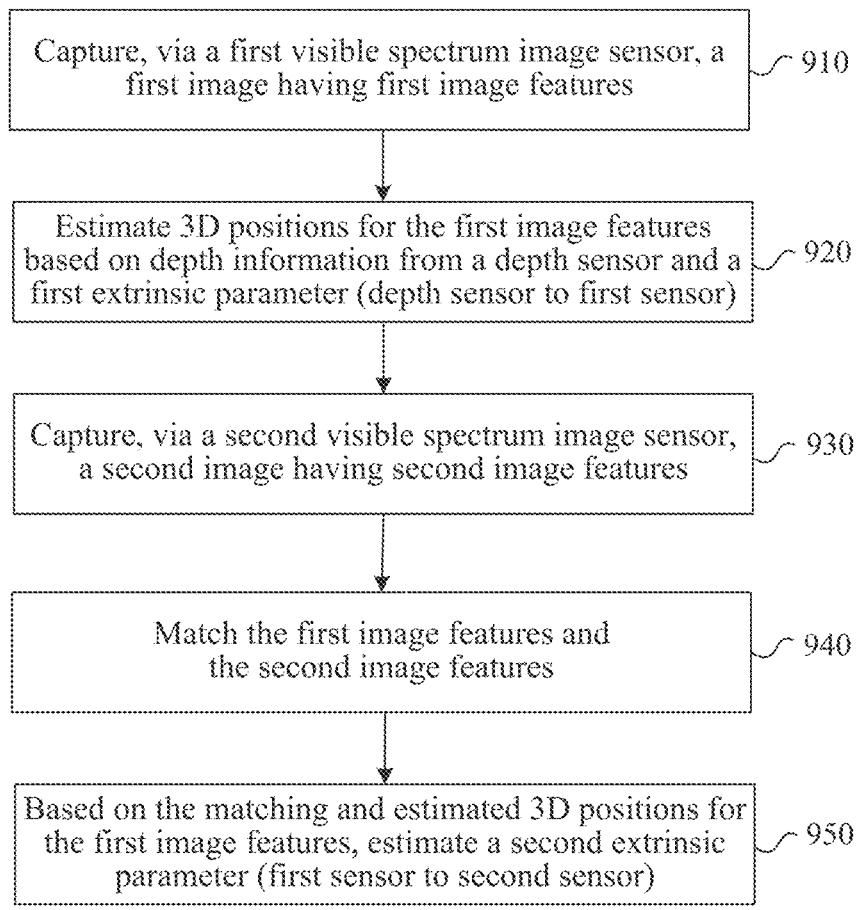
FIG. 9 is a flowchart representation of a method for another method for estimating an extrinsic parameter representing a sensor-to-sensor spatial relationship between sensors of a multi-sensor device.

FIG. 9 is a flowchart representation of a method 900 for another method for estimating an extrinsic parameter representing a sensor-to-sensor spatial relationship between sensors of a multi-sensor device. In some implementations, the method 900 is performed by a device that has a processor, a first visible spectrum (e.g., RGB) image sensor, a second visible spectrum image sensor, a depth sensor, and instructions stored on a computer-readable medium (e.g., device 510 of FIGS. 5-6). The device may be configured to change the spatial relationship between the sensors in response to user manipulation of the device or user input on the device. The method 900 can be performed at an HMD, mobile device, desktop, laptop, or server device. The method 900 can be performed on a HMD that has a single or multiple screens, for example, for viewing stereoscopic images. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 captures, via the first visible spectrum image sensor, a first image of first image features. At block 920, the method 900 estimates 3D positions for the first image features based on depth information from the depth sensor and a first extrinsic parameter corresponding to a spatial relationship between the depth sensor and the first visible spectrum image sensor. At block 930, the method 900 captures, via the second visible spectrum image sensor, a second image of second image features.

At block 940, the method 900 matches the first image features and the second image features. At block 950, based on the matching and estimated 3D positions for the first image features, the method 900 estimates a second extrinsic parameter corresponding to a spatial relationship between the first visible spectrum image sensor and the second visible spectrum image sensor. In some implementations, extrinsic parameters corresponding to the spatial relationship between the first sensor and the second sensor are estimated with respect to six degrees of freedom. In some implementations, the method 900 further involves calibrating the second visible spectrum image sensor to the first visible spectrum image sensor based on the extrinsic parameter(s). In one example, this involves adjusting spatial relationship information regarding the sensors to more accurately correspond to the estimated extrinsic parameter.

In some implementations, the method 900 further involves identifying a desired inter-pupil distance (IPD) corresponding to a user of the device and automatically changing the spatial relationship between the first visible spectrum image sensor and the second visible spectrum image sensor to correspond to the desired IPD.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device comprising a processor, a projector, a first infrared (IR) sensor, a second IR sensor, and instructions stored on a computer-readable medium,
      projecting, via the projector, infrared (IR) pattern elements onto an environment surface;

capturing, via the first IR sensor, a first image comprising first IR pattern elements corresponding to the projected IR pattern elements;
estimating 3D positions for the first IR pattern elements according to a first extrinsic parameter corresponding to a spatial relationship between the projector and the first IR sensor;
capturing, via the second IR sensor, a second image comprising second IR pattern elements corresponding to the projected IR pattern elements;
matching the first IR pattern elements and the second IR pattern elements; and
based on the matching and estimated 3D positions for the first IR pattern elements, estimating a second extrinsic parameter corresponding to a spatial relationship between the first IR sensor and the second IR sensor.

2. The method of claim 1, wherein the device is configured to change the spatial relationship between the first IR sensor and the second IR sensor in response to user manipulation of the device or user input on the device.

3. The method of claim 1, further comprising matching the first image with at least one reference image.

4. The method of claim 1, wherein the device is a head mounted device (HMD) comprising:
a first visible spectrum image sensor in a fixed spatial relationship to the first IR sensor and corresponding to a first display on the HMD; and
a second visible spectrum image sensor in a fixed spatial relationship to the second IR sensor and corresponding to a second display of the HMD.

5. The method of claim 1, further comprising:
identifying a desired inter-pupil distance (IPD) corresponding to a user of the device; and
automatically changing the spatial relationship between the first IR sensor and the second IR sensor to correspond to the desired IPD.

6. The method of claim 1 further comprising estimating extrinsic parameters corresponding to the spatial relationship between the first IR sensor and the second IR sensor with respect to six degrees of freedom.

7. The method of claim 6 further comprising calibrating the second IR sensor to the first IR sensor based on the extrinsic parameters.

8. The method of claim 1, wherein the first IR sensor is integrated with the projector in a single unit, wherein the spatial relationship between the projector and the first IR sensor is fixed in the single unit.

9. The method of claim 1, wherein the 3D positions for the first IR pattern elements are estimated based on intrinsic parameters of the projector or the first IR sensor.

10. The method of claim 1, wherein the matching comprises:
detecting an object depicted in the first image and the second image; and
matching first IR pattern elements according to the object in the first image with second IR pattern elements according to the object in the second image.

11. A system comprising:
a non-transitory computer-readable storage medium;
a projector;
a first IR sensor;
a second IR sensor; and
a processor coupled to the non-transitory computer-readable storage medium, wherein the non-transitory computer-readable storage medium comprises program instructions that, when executed on the processor, cause the system to perform operations comprising:
projecting, via the projector, infrared (IR) pattern elements onto an environment surface;
capturing, via the first IR sensor, a first image comprising first IR pattern elements corresponding to the projected IR pattern elements;
estimating 3D positions for the first IR pattern elements according to a first extrinsic parameter corresponding to a spatial relationship between the projector and the first IR sensor;
capturing, via the second IR sensor, a second image comprising second IR pattern elements corresponding to the projected IR pattern elements;
matching the first IR pattern elements and the second IR pattern elements; and
based on the matching and estimated 3D positions for the first IR pattern elements, estimating a second extrinsic parameter corresponding to a spatial relationship between the first IR sensor and the second IR sensor.

12. The system of claim 11, wherein the system is configured to change the spatial relationship between the first IR sensor and the second IR sensor in response to user manipulation of the device or user input on the device.

13. The system of claim 11, wherein the operations further comprise matching the first image with at least one reference image.

14. The system of claim 11, wherein the system is a head mounted device (HMD) comprising:
a first visible spectrum image sensor in a fixed spatial relationship to the first IR sensor and corresponding to a first display on the HMD; and
a second visible spectrum image sensor in a fixed spatial relationship to the second IR sensor and corresponding to a second display of the HMD.

15. The system of claim 11, wherein the operations further comprise:
identifying a desired inter-pupil distance (IPD) corresponding to a user of the device; and
automatically changing the spatial relationship between the first IR sensor and the second IR sensor to correspond to the desired IPD.

16. The system of claim 11, wherein the operations further comprise estimating extrinsic parameters corresponding to the spatial relationship between the first IR sensor and the second IR sensor with respect to six degrees of freedom.

17. The system of claim 11, wherein the operations further comprise calibrating the second IR sensor to the first IR sensor based on the extrinsic parameters.

18. The system of claim 11, wherein the first IR sensor is integrated with the projector in a single unit, wherein the spatial relationship between the projector and the first IR sensor is fixed in the single unit.

19. The system of claim 11, wherein the 3D positions for the first IR pattern elements are estimated based on intrinsic parameters of the projector or the first IR sensor.

20. The system of claim 11, wherein the matching comprises:
detecting an object depicted in the first image and the second image; and
matching first IR pattern elements according to the object in the first image with second IR pattern elements according to the object in the second image.

* * * * *